(No Model.)

F. O. BULLIS.
BICYCLE.

No. 597,098. Patented Jan. 11, 1898.

WITNESSES:
G. S. Dey.
C. G. Cranmell.

INVENTOR:
Frederick O. Bullis
By Geo. B. Selden,
atty.

United States Patent Office.

FREDERICK O. BULLIS, OF BRIGHTON, NEW YORK, ASSIGNOR, BY DIRECT AND MESNE ASSIGNMENTS, TO FRANCES BULLIS, OF SAME PLACE, GOSS & CO., OF ROCHESTER, AND LORING H. BANNISTER, OF EVANS, NEW YORK.

BICYCLE.

SPECIFICATION forming part of Letters Patent No. 597,098, dated January 11, 1898.

Application filed January 21, 1897. Serial No. 620,053. (No model.)

*To all whom it may concern:*

Be it known that I, FREDERICK O. BULLIS, a citizen of the United States, residing at Brighton, in the county of Monroe, in the State of New York, have invented certain Improvements in Bicycles, of which the following is a specification, reference being had to the accompanying drawings.

My invention relates to certain improvements in the construction of bicycles, which improvements are fully described and illustrated in the following specification and the accompanying drawings, the novel features thereof being specified in the claims annexed to the said specification.

Figure 1:
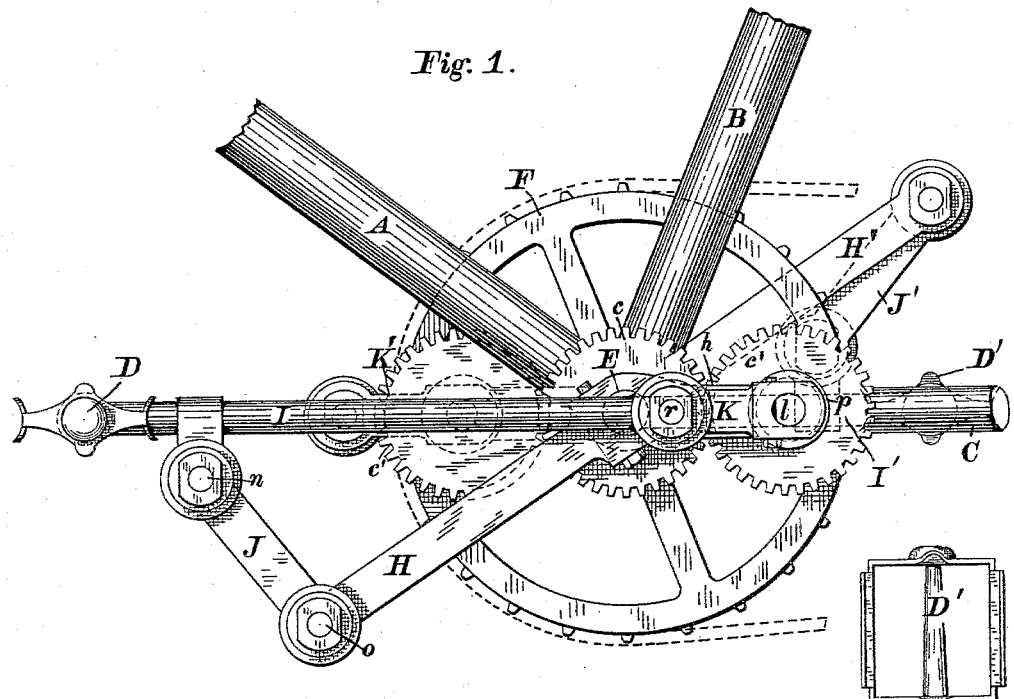
Figure 2:
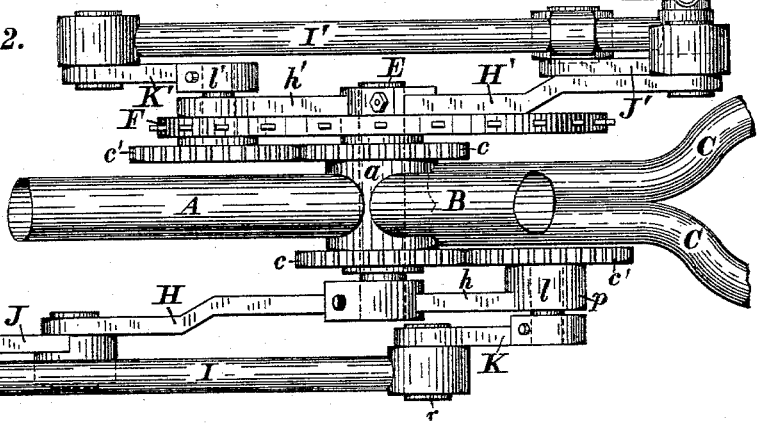
Figure 3:
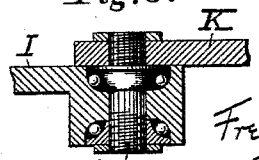

In the accompanying drawings, Figure 1 is a side elevation. Fig. 2 is a plan view. Fig. 3 is an enlarged detail of one of the ball-bearing joints.

The object of my improvement is to increase the leverage of the pedals during the downstroke, thus enabling the rider to apply greater power to the propulsion of the machine or to render any given amount of effort more effective without employing any complicated mechanism or involving any injurious friction.

In the accompanying drawings, A B C represent a portion of the frame of a bicycle of any ordinary or preferred construction; D D', the pedals; E, the crank-shaft; F, the sprocket wheel and chain, and H H' the cranks. The crank-shaft passes through the central boss or hub $a$, being provided with ball-bearings in any suitable or preferred manner, and the cranks are attached to the crank-shaft in any ordinary way. The sprocket-wheel is fastened to the crank-shaft inside one of the cranks. The pedals are carried by the pedal-levers I I', which near their forward ends are connected with the cranks H H' by the links J J' and at their rear ends are jointed onto the revolving cranks K K', which receive rotary motion from the gears $c\ c'$, of which one, $c$, on each side is fastened on the hub $a$ and the other, $c'$, is carried by the extensions $h\ h'$ of the cranks H H', so that as the cranks revolve the gears $c'\ c'$ are carried bodily around the gears $c$, by which they are at the same time caused to rotate.

It will be understood that the gears $c$ do not revolve, but cause the revolution of the gears $c'$ as they travel around them. The gears $c\ c'$ are of the same size, so that each gear $c'$ makes a complete revolution on its axis, with the cranks K K', for each time they travel around the crank-shaft. On one side one of the shafts $l\ l'$, which connect the traveling gears $c\ c'$ with the cranks K K', passes through the sprocket-wheel F. The pedal-levers I I', being supported at their pedal ends from the main cranks H H' and at their other ends by the cranks K K', will as they revolve carry the pedals through paths which are elliptical or elongated at their front sides, so that the speed and leverage of the pedals are increased during their downward stroke, thereby enabling the operator to apply greater power and to propel the bicycle more rapidly than with the ordinary cranks. The upstroke is made without involving any greater travel of the foot, and on account of the improved method of applying the power my invention is of special advantage in climbing hills. Any or all of the joints between the various parts and the bearings for the shafts $l\ l'$ may be provided with antifriction or ball bearings. The pedals are attached to the pedal-levers in any suitable or ordinary way.

The studs $n$ project from the links J and engage in bosses, brazed or otherwise, secured to the pedal-levers. The links are similarly pivoted at their other ends to studs $o$ on the cranks. The shafts $l\ l'$ of the traveling gears revolve in suitable bearings in bosses $p$ on the ends of the extensions $h\ h'$ of the cranks H H'. The cranks K K' are provided with studs $r$, on which the bosses at the ends of the pedal-levers revolve. It will, however, be understood that many changes and variations may be made in the construction without departure from the principles of my invention. The crank H and its extension $h$ are herein represented as arranged at angles with each other, but such arrangement is not essential. The cranks K K' are so arranged that they both project forward at the same time in the revolution of the crank-shaft, and thus place the then active crank on its downstroke in an advantageous position. The gears $c\ c'$ may be boxed in to exclude mud and dust. It will be understood also that the studs $n$ may be arranged in the same line with the pedal-levers.

It will be observed that in consequence of my improved construction I avoid dead-centers by changing the angles of the cranks—that is, when one of the pedals is directly below the crank-shaft the other pedal has already advanced on its downward travel a considerable distance, which may be varied by changing the position of the joint between the pedal-lever and the link lengthwise on the lever.

I claim—

1. The combination with the frame of a bicycle, having gears attached thereto on opposite sides, of the crank-shaft and main cranks provided with opposite extensions, the pedals, the pedal-levers linked to the main cranks, the cranks K K', the traveling gears journaled in the crank extensions and meshing with the gears on the frame, said cranks revolving with the traveling gears and pivotally connected with the pedal-levers, and the sprocket-wheel on the shaft between one of the main cranks and the proximate gear-wheels, substantially as described.

2. The combination of the driving-shaft, the driving-shaft cranks having each an extension on the opposite side of the shaft set at an angle to its main portion, gears $c$ fixed on the shaft, traveling gears $c'$ each pivotally supported in a crank extension and rotatable about a gear $c$, pedal-levers one for each crank, cranks fixed to the shafts of the traveling gears and connecting the rear end of the levers with the crank extensions, and links connecting the forward end of the levers with the adjacent ends of the main cranks, and a driving-wheel fixed to the driving-shaft inside a main crank, all substantially as described.

3. In a bicycle the combination of the driving-shaft, the main cranks having opposite extensions, the pedal-levers, the gears fixed to the hub, the gears journaled in the crank extensions and adapted to be rotated around and in mesh with the fixed gears, lever extending and retracting cranks fixed to the shafts of the traveling gears and pivotally connected to the pedal-levers, said shafts being journaled in the extensions of the main cranks, pivoted links J also connecting the main cranks and pedal-levers, and a sprocket-wheel fixed to the driving-shaft, a fixed and a rotary gear being situated inside the sprocket-wheel and the levers and their extending and retracting cranks outside the main cranks, substantially as described.

FREDERICK O. BULLIS.

Witnesses:
GEO. B. SELDEN,
C. G. CRANNELL.